United States Patent
Kurth et al.

(10) Patent No.: US 11,827,566 B2
(45) Date of Patent: Nov. 28, 2023

(54) REJUVENATING COMPOUNDS IN HIGH PERFORMANCE ASPHALT COMPOSITIONS WITH HIGH RECYCLED CONTENT

(71) Applicant: CARGILL, INCORPORATED, Wayzata, MN (US)

(72) Inventors: Todd Kurth, Maple Grove, MN (US); Scott Nivens, Minneapolis, MN (US); Christopher Stevermer, St. Louis Park, MN (US); Anthony Joseph Sylvester, Minneapolis, MN (US); Hassan Tabatabaee, Plymouth, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 686 days.

(21) Appl. No.: 16/604,780

(22) PCT Filed: Apr. 12, 2018

(86) PCT No.: PCT/US2018/027309
§ 371 (c)(1),
(2) Date: Oct. 11, 2019

(87) PCT Pub. No.: WO2018/191501
PCT Pub. Date: Oct. 18, 2018

(65) Prior Publication Data
US 2021/0284574 A1 Sep. 16, 2021

Related U.S. Application Data

(60) Provisional application No. 62/597,678, filed on Dec. 12, 2017, provisional application No. 62/484,526, filed on Apr. 12, 2017.

(51) Int. Cl.
C04B 26/26 (2006.01)
C08L 91/00 (2006.01)
C08L 95/00 (2006.01)

(52) U.S. Cl.
CPC .............. *C04B 26/26* (2013.01); *C08L 91/00* (2013.01); *C08L 95/00* (2013.01);
(Continued)

(58) Field of Classification Search
None
See application file for complete search history.

(56) References Cited

U.S. PATENT DOCUMENTS

2016/0369203 A1    12/2016 Kurth
2018/0044529 A1*    2/2018 Kurth ...................... C11C 3/00

FOREIGN PATENT DOCUMENTS

CN    104773976 A    7/2015
CN    105837090 A    8/2016
(Continued)

OTHER PUBLICATIONS

Freire, et al., "Mechanical Behavior of Asphalt Mixtures to be used in Railway Infrastructures", SIIV Roma MMXII—5th International Congress, Oct. 2012.
(Continued)

*Primary Examiner* — Colin W. Slifka

(57) ABSTRACT

Described herein is a rejuvenated asphalt and a method of rejuvenating asphalt comprising mixing a rejuvenator, bitumen, and aggregate to obtain an asphalt mixture, wherein the rejuvenator is present in an amount ranging from about 0.1-40 wt % by weight of the bitumen, and wherein at least 35 wt % of the bitumen is derived from recycled asphalt content. The rejuvenated asphalt provides desirable performance.

21 Claims, 3 Drawing Sheets

(52) U.S. Cl.
CPC ....... *C08L 2555/22* (2013.01); *C08L 2555/34* (2013.01); *C08L 2555/64* (2013.01)

(56) References Cited

FOREIGN PATENT DOCUMENTS

| | | |
|---|---|---|
| CN | 106186834 A | 12/2016 |
| CN | 106186837 A | 12/2016 |
| JP | 2015514859 A | 5/2015 |
| JP | 2016537497 A | 12/2016 |
| WO | 2008026811 A1 | 3/2008 |
| WO | 2013163463 A1 | 10/2013 |
| WO | 2015070180 A1 | 5/2015 |
| WO | 2016138377 A1 | 9/2016 |
| WO | 2016138384 A1 | 9/2016 |
| WO | 2016138390 A1 | 9/2016 |
| WO | 2016138407 A1 | 9/2016 |
| WO | 2016149102 A1 | 9/2016 |
| WO | 2017147485 A1 | 8/2017 |

OTHER PUBLICATIONS

Imad L Al-Qadi et al: "Impact of High Rap Content On Structural and Performance Properties of Asphalt Mixtures", Illinois Center for Transportation Series 12-002 (ISSN 0197-9191), Jun. 1, 2012 (Jun. 1, 2012), pp. 1-107, XP055757558, Retrieved from the Internet: URL:https://www.ideals.illinois.edu/bitstream/handle/2142/45810/FHWA-ICT-12-002.pdf? sequence=2.

Anonymous: "Asphalt the 100% recyclable construction product (EAPA Position paper)", Jun. 1, 2014 (Jun. 1, 2014), pp. 1-21, XP055756770, Brussels, Belgium Retrieved from the Internet: URL:https://eapa.org/wp-content/uploads/2018/07/EAPApaper_Asphalt_the-100 -_ recyclable_construction-product.pdf.

Adriana Vargas-Nordcbeck et al: "Rutting characterization of warm mix asphalt and high RAP mixtures", Road Materials and Pavement Design, vol. 13, No. supl, Jun. 1, 2012 (Jun. 1, 2012), pp. 1-20, XP055756890, ISSN: 1468-0629, DOI: 10.1080/14680629.2012.657042.

Anonymous et al: "Application of Reclaimed Asphalt Pavement and Recycled Asphalt Shingles in Hot-Mix Asphalt; National and International Perspectives on Current Practice; E-CI88", Transportation Research Circular E-C188, Oct. 1, 2014 (Oct. 1, 2014), pp. 1-78, XP055608246, Washington DC, USA Retrieved from the Internet: URL:http://onlinepubs.trb.org/onlinepubs/circulars/ec188.pdf.

Anonymous: "Reclaimed Asphalt Pavement in Asphalt Mixtures: State of the Practice -FHWA-HRT-11-021", Apr. 1, 2011 (Apr. 1, 2011), pp. 1-60, XP055608258, 6300 Georgetown Pike Mclean, VA 22101-2296, USA Retrieved from the Internet: URL:https://www.fhwa.dot.gov/publications/research/infrastructure/pavements/11021/11021.pdf.

C. Petersen and R. Glaser, "Asphalt Oxidation Mechanisms and the Role of Oxidation Products on Age Hardening Revisited," Road Materials and Pavement Design, vol. 12, pp. 795-819, 2011.

C. Petersen, "A Review of the Fundamentals of Asphalt Oxidation: Chemical, Physicochemical, Physical Property, and Durability Relationships," Transportation Research Board, Washington, D.C., 2009.

D. Christensen and D. Anderson, "Chemical-Physical Property Relationships for Asphalt Cements and the Dispersed Fluid Model," in Proceedings of the Trasportation Research Board, Washington D.C., 1992.

David E Newcomb et al: "Use of RAP & RAS in High Binder Replacement Asphalt Mixtures: A Synthesis (Special Report 213)", Mar. 1, 2016 (Mar. 1, 2016), pp. 1-68, XP055593167, NAPA Building, 5100 Forbes Blvd., Lanham, MD 20706-4407, USA Retrieved from the Internet: http://driveasphalt.org/assets/content/resources/SR213 _- RAP-RAS_Synthesis-lr.pdf.

E. R. Brown et al: "Designing Stone Matrix Asphalt Mixtures for Rut-Resistant Pavements (Report 425)", Jan. 1, 1999 (Jan. 1, 1999), pp. 1-82, XP055552290, Washington, D.C., USA ISBN: 978-0-309-06319-7 Retrieved from the Internet: URL:http://onlinepubs.trb.org/onlinepubs/nchrp/nchrp_rpt_425.pdf.

Eddie Johnson et al: "Recycled Asphalt Pavement: Study of High-RAP Asphalt Mixtures on Minnesota County Roads", May 1, 2013 (May 1, 2013), pp. 1-83, XP055758287, St. Paul, MN 55155, USA Retrieved from the Internet: URL:http://www.lrrb.org/pdf/201315.pdf.

Eyassu Hagos et al: The development of 100% RAP asphalt mixture with the use of innovative rejuvenator, Proceedings of 6th Eurasphalt & Eurobitume Congress, Jun. 1, 2016 (Jun. 1, 2016), pp. 1-10, XP055756726, DOI: 10.14311/EE.2016.093 ISBN: 978-80-01-05962-3.

H. Bahia, H. Tabatabaee and R. Velasquez, "Asphalt Thermal Cracking Analyzer," in 7th International Conference on Cracking in Pavements, Netherlands, 2012.

H. Tabatabaee, R. Velasquez and H. Bahia, "Predicting Low Temperature Physical Hardening in Asphalt Binders," Submitted for publication in the Journal of Construction and Building Materials, 2012.

Haleh Azari: "Precision Estimates of AASHTO T 324, Hamburg Wheel-Track Testing of Compacted Hot Mix Asphalt (HMA) (2014)" In: "National Academies of Sciences, Engineering, and Medicine 2014", Nov. 23, 2014 (Nov. 23, 2014), The National Academies Press, Washington, D.C., XP055757379, ISBN: 978-0-309-30812-0 pp. 1-51, DOI: 10.17226/22242.

Hallizza Asli et al: "Investigation on physical properties of waste cooking oil -Rejuvenated bitumen binder", Construction and Building Materials, vol. 37, Dec. 1, 2012 (Dec. 1, 2012), pp. 398-405, XP055757048, Netherlands ISSN: 0950-0618, DOI: 10.1016/j.conbuildmat.2012.07.042.

Hassan A. Tabatabaee et al: "Establishing use of asphalt binder cracking tests for prevention of pavement cracking", Road Materials and Pavement Design, vol. 15, No. supl, Jun. 27, 2014 (Jun. 27, 2014), pp. 279-299, XP055756814, ISSN: 1468-0629, DOI: 10.1080/14680629.2014.927949.

J Richard Willis et al: "Effects of Changing Virgin Binder Grade and Content On Rap Mixture Properties (NCAT Report N° 12-03)", May 1, 2012 (May 1, 2012), pp. 1-47, XP055593264, 277 Technology Parkway, Auburn, AL 36830, USA Retrieved from the Internet: URL:http://dsp2002.eng.auburn.edu/research/centers/ ncat/files/reports/2012/rep12-03.pdf.

John Moore: "Chapter 14, Asphalt Production Plants" In: "Chapter 14, Asphalt Production Plants", Jan. 1, 2015 (Jan. 1, 2015), ICE Publishing, Westminster, London, UK, XP055755452, ISBN: 978-0-7277-5837-8 pp. 379-412.

Kai Su et al: "Laboratory Investigation of Possibility of Re-Recycling Asphalt Concretes", 6th ICPT, Jul. 1, 2008 (Jul. 1, 2008), pp. 435-442, XP055756765, Sapporo, Japan.

Martins Zaumanis et al: "100% recycled hot mix asphalt: A review and analysis", Resources, Conservation and Recycling, vol. 92, Nov. 1, 2014 (Nov. 1, 2014), pp. 230-245, XP055593153, Amsterdam, NL ISSN: 0921-3449, DOI: 10.1016/j.resconrec.2014.07.007.

Pahlavan Farideh et al: "Characterization of oxidized asphaltenes and the restorative effect of a bio-modifier", FUEL, vol. 212, 2018, pp. 593-604, XP085280115, ISSN: 0016-2361, DOI: 10.1016/J.FUEL.2017.10.090.

Qing Lu et al: "Evaluation of Hamburg Wheel-Tracking Device Test with Laboratory and Field Performance Data", Transportation Research Record: Journal of the Transportation Research Board, vol. 1970, Jan. 1, 2006 (Jan. 1, 2006), pp. 25-44, XP055756855.

Randy West et al: "NCAT Report 18-04, Phase VI (2015-2017) NCAT Test Track Findings", Jul. 1, 2019 (Jul. 1, 2019), pp. 1-195, XP055757134, Auburn, AL 36830, USA Retrieved from the Internet: URL:http://eng.auburn.edu/research/centers/ncat/files/technical-reports/rep18-04.pdf.

Rebecca Mcdaniel et al: "Recommended Use of Reclaimed Asphalt Pavement in the Superpave Mix Design Method: Technician's Manual, NCHRP Report 452", National Cooperative Highway Research Program, Jan. 1, 2001 (Jan. 1, 2001), pp. 1-58, XP055757335, Washington D.C., USA ISBN: 978-0-309-06670-9 Retrieved from the Internet: URL:https://onlinepubs.trb.org/onlinepubs/nchrp/nchrp_rpt_452.pdf.

(56) References Cited

OTHER PUBLICATIONS

Robert N Hunter et al: "22.1 Recycling of asphalt pavements" In: "22.1 Recycling of asphalt pavements", Jan. 1, 2015 (Jan. 1, 2015), ICE Publishing, Westminster, London, UK, XP055755424, ISBN: 978-0-7277-5837-8, pp. 666-671.

S. Priyanto, G. Mansoori and A. Suwono, "Measurement of property relationships of nano-structure micelles and coacervates of asphaltene in a pure solvent," Chemical Engineering Science, vol. 56, p. 6933-6939, 2001.

Shin-Che Huang et al: "Rejuvenator for Enhancing RAP Applications and Improving Material Compatibility, Fundamental Properties of Asphalts and Modified Asphalts III Product: FP 16, Technical White Paper", Mar. 1, 2015 (Mar. 1, 2015), pp. 1-35, XP055594377, Laramie, WY 82072, USA Retrieved from the Internet: URL:https://pdfs.semanticscholar.org/35c8/a94fe69e4cebcfd153bc9de21a5a839881e8.pdf.

T. Yeh, "Colloidal Aspect of a Macrostructure of Petroleum Asphalt," Fuel Science & Technology International, vol. 10, No. 4, pp. 723-733, 1992.

Tereza Valentova et al: "Properties of Asphalt Mixtures with Multiple Recycled Asphalt Material", GEO-CHINA 2016; Fourth Geo-China International Conference (Jul. 25-27, 2016), American Society of Civil Engineers, Reston, VA, Jul. 21, 2016 (Jul. 21, 2016), pp. 1-10, XP009524448, DOI: 10.1061/9780784480052.001 ISBN: 978-0-7844-8005-2 Retrieved from the Internet: URL:https://ascelibrary.org/doi/10.1061/9780784480052.001.

Timo Blomberg et al: "Laboratory Simulation of Bitumen Aging and Rejuvenation to Mimic Multiple Cycles of Reuse", Transportation Research Procedia, vol. 14, Jan. 1, 2016 (Jan. 1, 2016), pp. 694-703, XP055757902, ISSN: 2352-1465, DOI: 10.1016/j.trpro.2016.05.335.

Tirupan Mandal et al: "Challenges in using the Disc-Shaped Compact Tension (DCT) test to determine role of asphalt mix design variables in cracking resistance at low temperatures", The International Journal of Pavement Engineering, vol. 20, No. 11, Nov. 2, 2019 (Nov. 2, 2019), pp. 1275-1284, XP055757097, GB ISSN: 1029-8436, DOI: 10.1080/10298436.2017.1405001.

Tirupan Mandal et al: "Evaluation of analysis methods of the semi-circular bend (SCB) test results for measuring cracking resistance of asphalt mixtures", International Journal of Pavement Research and Technology, vol. 12, No. 5, Aug. 22, 2019 (Aug. 22, 2019), pp. 456-463, XP055757104, ISSN: 1996-6814, DOI: 10.1007/s42947-019-0055-7.

Tony Sylvester et al: "Rejuvenation vs. Softening of Recycled Binders", Mar. 13, 2017 (Mar. 13, 2017), pp. 1-25, XP055577082, England DOI: 10.1093/fampra/8.3.202 Retrieved from the Internet: URL:https://il-asphalt.org/files/8714/8969/2569/2017Sylvester.pdf.

Tsai Bor-Wen et al: "Evaluation of AASHTO T 324 Hamburg-Wheel Track Device test", Construction and Building Materials, Elsevier, Netherlands, vol. 114, Apr. 2, 2016 (Apr. 2, 2016), pp. 248-260, XP029529328, ISSN: 0950-0618, DOI: 10.1016/J.CONBUILDMAT.2016.03.171.

Usama Heneash: "Effect of the repeated recycling on hot mix asphalt properties", Jan. 1, 2013 (Jan. 1, 2013), XP055758295, Retrieved from the Internet: URL:https://www.nottingham.ac.uk/research/groups/ntec/documents/theses/usama-heneash.pdf.

Wade Miller: "Recycling Emulsions for Pavement Preservation "Going from Good to Great to Green"", Nov. 4, 2009 (Nov. 4, 2009), pp. 1-143, XP055594517, Retrieved from the Internet: URL:https://cdn.ymaws.com/www.azace.org/resource/resmgr/imported/2009_11_04_WesternEmulsions_WadeMiller_AACE.pdf.

Zaumanis Martins et al: "Evaluation of different recycling agents for restoring aged asphalt binder and performance of 100% recycled asphalt", Materials and Structures, London, GB, vol. 48, No. 8, May 22, 2014 (May 22, 2014), pp. 2475-2488, XP035520657, ISSN: 1359-5997, DOI: 10.1617/S11527-014-0332-5.

Zaumanis Martins et al: "Influence of six rejuvenators on the performance properties of Reclaimed Asphalt Pavement (RAP) binder and 100% recycled asphalt mixtures", Construction and Building Materials, Elsevier, Netherlands, vol. 71, Sep. 20, 2014 (Sep. 20, 2014), pp. 538-550, XP029080483, ISSN: 0950-0618, DOI: 10.1016/J.CONBUILDMAT.2014.08.073.

\* cited by examiner

Figure 1: Failure Energy Schematic

Figure 2: Dilatometric Glass Transition Temperature Definition

REJUVENATING COMPOUNDS IN HIGH PERFORMANCE ASPHALT COMPOSITIONS WITH HIGH RECYCLED CONTENT

CROSS-REFERENCE TO RELATED APPLICATIONS

This application is a national phase application of International Application No. PCT/US2018/027309, filed Apr. 12, 2018, entitled REJUVENATING COMPOUNDS IN HIGH PERFORMANCE ASPHALT COMPOSITIONS WITH HIGH RECYCLED CONTENT, which claims the benefit of U.S. Provisional Patent Application No. 62/484,526, filed Apr. 12, 2017, entitled REJUVENATING COMPOUNDS IN HIGH PERFORMANCE ASPHALT COMPOSITIONS WITH HIGH RECYCLED CONTENT, and which claims the benefit of U.S. Provisional Patent Application No. 62/597,678, filed Dec. 12, 2017, entitled REJUVENATING COMPOUNDS IN HIGH PERFORMANCE ASPHALT COMPOSITIONS WITH HIGH RECYCLED CONTENT, each of which is hereby incorporated by reference in its entirety.

TECHNICAL FIELD

This disclosure relates to a method of utilizing a rejuvenator derived from a biorenewable oil source to rejuvenate recycled and/or aged bituminous material to enhance overall performance.

BACKGROUND

Recent technical challenges facing the asphalt industry have created opportunities for the introduction of agriculture-based products for the overall performance enhancement of asphalt. Such performance enhancements may include rejuvenating aged asphalt.

SUMMARY

Described herein is a method of rejuvenating asphalt comprising mixing a rejuvenator, bitumen, and aggregate to obtain an asphalt mixture, wherein the rejuvenator is present in an amount ranging from about 0.1-40 wt % by weight of the bitumen, and wherein at least 35 wt % of the bitumen is derived from recycled asphalt content. The asphalt mixture described herein provides desirable performance. Further described herein is a high performing rejuvenated asphalt comprising a rejuvenator, bitumen, and aggregate, wherein the rejuvenator is present in an amount ranging from about 0.1-40 wt % by weight of the bitumen, and wherein at least 35 wt % of the bitumen is derived from recycled asphalt content.

FIGURES

FIG. 1 graphically illustrates a failure energy schematic.

FIG. 2 graphically illustrates a dilatometric glass transition temperature definition.

DETAILED DESCRIPTION

Figure 1:
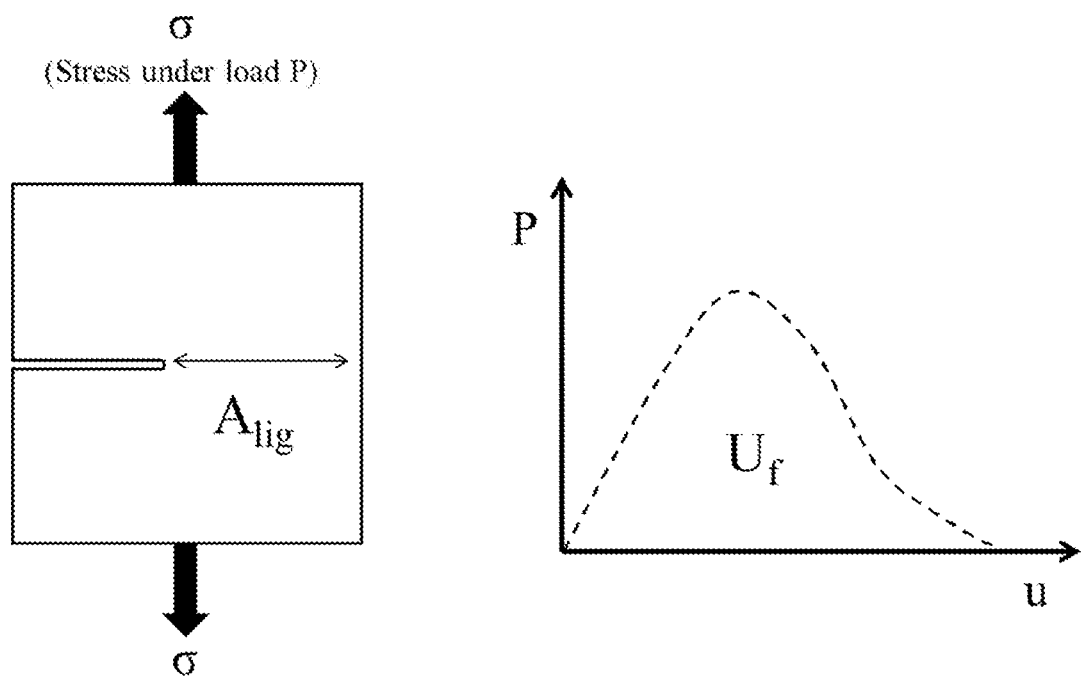
Figure 2:
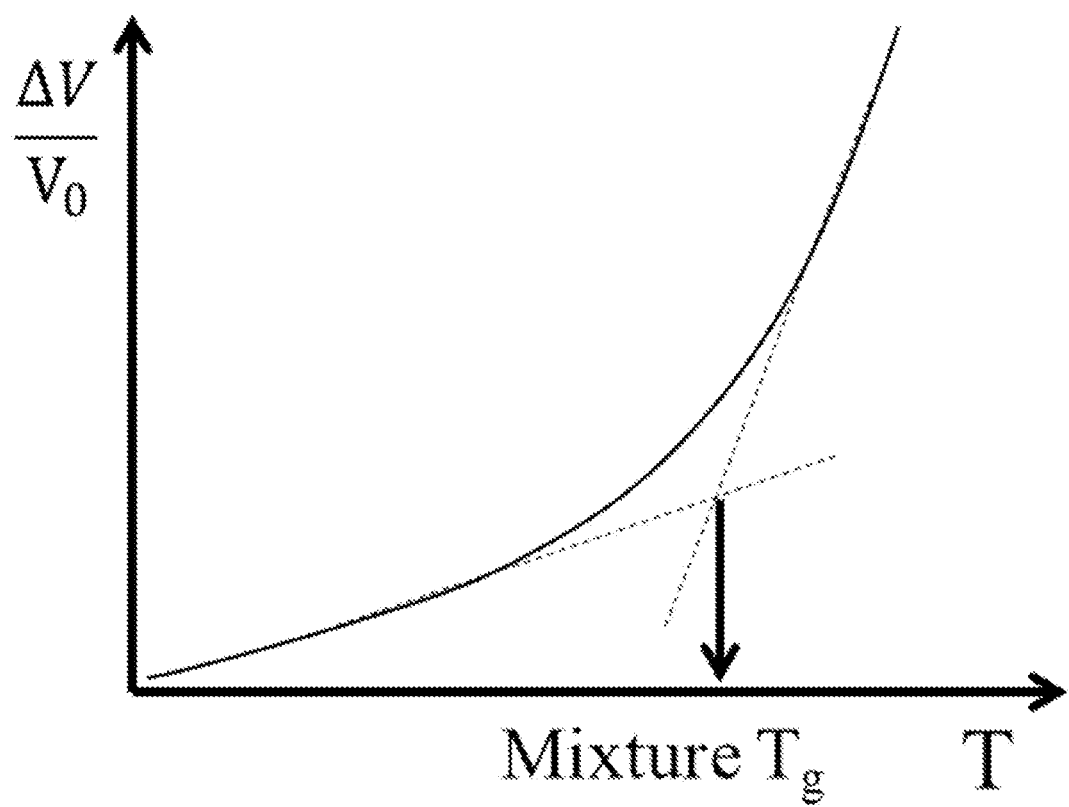

As used herein, "asphalt", "asphalt binder", "binder" and "bitumen" refer to the binder phase of an asphalt pavement. The binder can be material acquired from asphalt producing refineries, flux, refinery vacuum tower bottoms, pitch, and other residues of processing of vacuum tower bottoms, as well as oxidized and aged asphalt from recycled bituminous material such as reclaimed asphalt pavement (RAP), and recycled asphalt shingles (RAS). Further, the binder can be a polymer-modified binder already containing polymer additives (may be already in the recycled bituminous material or added directly to the recycled bituminous material before incorporation into the asphalt mixture), for example, styrene, divinylbenzene, indene, styrene-butadiene-styrene, and polyolefins.

As used herein, "aggregate" refers to the rock phase of an asphalt pavement which is bound together by a binder. The aggregate can be material acquired from RAP and RAS sources and/or can be virgin material not previously used in asphalt applications.

As used herein, "asphalt mixture" refers to the combination of rejuvenator, bitumen, and aggregate and is a product that can be applied to road and roofing applications.

As used herein "rejuvenator" refers to a component or composition that contributes to or replenishes the resin fraction of aged recycled asphalt content. In aspects of the present invention, the rejuvenator can be derived from a biorenewable oil source and in preferred aspects is a polymerized oil derived from a biorenewable oil source.

As used herein "recycled asphalt content" includes RAP, RAS or asphalt resulting from a solvent de-asphalting process. Such recycled asphalt content includes that which is being recycled for the first time and include that which has been recycled multiple times.

Asphalt "ages" through a combination of mechanisms, mainly oxidation and volatilization. Aging increases asphalt modulus, decreases viscous dissipation and stress relaxation, and increases brittleness at lower performance temperatures. As a result, the asphalt becomes more susceptible to cracking and damage accumulation. The increasing usage of recycled and reclaimed bituminous materials which contain highly aged asphalt binder from sources such as reclaimed asphalt pavements (RAP) and recycled asphalt shingles (RAS) have created a necessity for "rejuvenators" capable of partially or completely restoring the rheological and fracture properties of the aged asphalt.

Without being bound to any particular theory, the following description of the chemical structure of bitumen and the mechanisms of aging is provided. Asphalt comprises a complex continuum of compounds covering spectrums of molecular weights, functionality, polarity, and heteroatom content. As a result, asphalt is often conveniently fractionated in terms of reactivity and solubility using a predetermined set of solvents. Researchers have described the interactions between the defined fractions using a number of models such as the colloidal model [1, 2, 3, 4]. In the colloidal model a medium or continuous phase is defined as mainly consisting of relatively low polarity naphthenic-aromatic compounds (or "solvent phase") and paraffinic compounds that may consist of crystalline fractions. A dispersion of highly polar micelles at various levels of intermolecular association in the continuous medium provides much of the mechanical and rheological properties of the asphalt. The constituents of the micelles are often defined as a high polarity and high molecular weight "asphaltene" fraction surrounded by a lower polarity "resin"

(also known as "polar aromatic") fractions with high affinity for both the neutral aromatic fraction and the polar asphaltene fraction [1, 5].

The balance between the fractions, especially that of the "resin" and "asphaltene" fraction is essential for maintaining a phase compatible and stable bitumen with good durability and rheological performance. This balance is disrupted by "aging" of the bitumen. Perhaps one of the most useful descriptions of the effect of such oxidative aging on the mechanical and damage resistance properties of asphalt has been offered by Petersen [1]: "If during oxidative aging, the concentration of polar functional groups becomes sufficiently high to immobilize an excessive number of molecules through intermolecular association, the molecules or molecular agglomerates lose sufficient mobility to flow past one another under thermal or mechanical stress. The resulting embrittlement of the asphalt makes it susceptible to fracturing or cracking and resistant to healing."

The use of the rejuvenator described herein are particularly useful for RAP and RAS applications, as the rejuvenator described in this document resembles the function of the "resin" fraction in the bitumen. This fraction acts as a compatibilizer of bitumen fractions and a disrupter of the associated polar (Asphaltene) fractions in bitumen, especially in aged and oxidized bitumen such as that from recycled asphalt pavements, resulting in a balanced and stable asphalt binder with restored performance and durability.

Provided herein is method of applying a specifically defined rejuvenator derived from biorenewable sources to asphalt mixtures with high amounts of recycled asphalt content, such as reclaimed asphalt pavements (RAP) and/or recycled asphalt shingles (RAS) to produce a high performing asphalt mixture for road and roofing applications.

An unexpected property of the rejuvenator is its ability to rejuvenate aging recycled asphalt products. Without being bound to any particular theory, it is believed that the rejuvenator is capable of replenishing the resin component of the recycled asphalt content. Thus the rejuvenator described herein can be any material derived from a biorenewable oil source that contributes or replenishes the "resin" fraction of an aged recycled asphalt content as measured by the combination of the measure of Asphaltenes as n-Heptane insolubles, as defined in ASTM D3279, and the Iatroscan MK-6S thin-layer chromatography method for fractionation of the n-Heptane soluble fraction, through adaption of the principles laid out in ASTM D4142 for fractionation of bitumen, using a n-Pentane to elute the "Saturates" and a 90:10 blend of Toluene and chloroform to elute the "cyclic" or "aromatic" fraction. Data was interpreted through assignment of the peak area in the retention time range of 0.01-0.250 to the "Saturates", "0.251-0.400 to the "Cyclics", and the remainder (0.401-0.510) to the "Resin" fraction.

The Hildebrand solubility parameter of the rejuvenator is a parameter that can signify the resemblance of a rejuvenator to the resin fraction of bitumen, which also can be indicative of its ability to behave as the resin fraction of the bitumen. The Hildebrand solubility parameter of the rejuvenator described herein ranges from about 6 to about 12.

Examples of biorenewable oils can include oils isolated from plants, animals, algae, and petrochemical sources.

Examples of plant-based oils may include but are not limited to soybean oil, linseed oil, canola oil, rapeseed oil, castor oil, tall oil, cottonseed oil, sunflower oil, palm oil, peanut oil, safflower oil, corn oil, corn stillage oil, lecithin (phospholipids) and combinations and crude streams thereof.

Examples of animal-based oils may include but are not limited to animal fat (e.g., lard, tallow) and lecithin (phospholipids), and combinations and crude streams thereof. Petrochemical based oil includes a broad range of hydrocarbon-based compositions and refined petroleum products, having a variety of different chemical compositions which are obtained from recovery and refining oils of fossil based original and considered non-renewable in that it takes millions of year to generate crude starting material.

Biorenewable oils can also include partially hydrogenated oils, oils with conjugated bonds, and bodied oils wherein a heteroatom is not introduced, for example but not limited to, diacylglycerides, monoacylglycerides, free fatty acids, alkyl esters of fatty acids (e.g., methyl, ethyl, propyl, and butyl esters), diol and triol esters (e.g., ethylene glycol, propylene glycol, butylene glycol, trimethylolpropane), and mixtures thereof. An example of biorenewable oils may be waste cooking oil or other used oils.

Biorenewable oils can also include previously modified or functionalized oils. Examples of previously modified oils are those that have been previously vulcanized or polymerized by other polymerizing technologies, such as maleic anhydride or acrylic acid modified, hydrogenated, dicyclopentadiene modified, conjugated via reaction with iodine, interesterified, or processed to modify acid value, hydroxyl number, or other properties. Some examples of previously modified oils are polyol esters, for example polyglycerol ester or a castor oil ester, or estolides. Such modified oils can be blended with unmodified plant-based oils or animal-based oils, fatty acids, glycerin, and/or lecithin. Examples of functionalized oils are those wherein a heteroatom (oxygen, nitrogen, sulfur, and phosphorus) has been introduced.

Such oils can be modified utilizing a variety of techniques, for example sulfurization as described in International Patent Applications WO2016/138377, WO2016/138384, WO2016/138407, and WO2016/138390; blowing and stripping as described in U.S. 2016/0369203 and International Patent Application WO2016/149102; and through polyol ester synthesis such as that described in International Patent Application PCT/US17/019445. Such polymerized oils are the preferred aspects of the rejuvenator.

The asphalt mixture comprises a rejuvenator, bitumen, and aggregate. The rejuvenator is present in the asphalt mixture in an amount typically ranging from about 0.1-40 wt % by weight of bitumen. In certain aspects, the rejuvenator is present in the asphalt mixture in an amount ranging from about 0.1-30 wt %, in some aspects from about 0.1-20 wt %, in some aspects from about 0.1-15 wt %, in some aspects from about 0.1-10 wt %, in some aspects from about 0.1-5 wt %, and in other aspects from 0.5-5 wt %.

The asphalt mixture typically comprises about 3-7 wt % of bitumen, and in some aspects from 4-6 wt % bitumen.

The remaining balance in the asphalt mixture comprises aggregate sourced from recycled asphalt content and/or virgin aggregate and can comprise other additives commonly used in asphalt applications such as thermoplastic elastomeric and plastomeric polymers (styrene-butadiene-styrene, ethylene vinyl-acetate, functionalized polyolefins, etc.), polyphosphoric acid, anti-stripping additives (amine-based, phosphate-based, etc.), warm mix additives, emulsifiers and/or fibers, to name a few.

The asphalt mixtures comprises high recycled content and demonstrates desirable performance properties which can primarily be attributed to the rejuvenator. High recycled asphalt content typically refers to asphalt mixtures, wherein the bitumen content is derived from at least about 35 wt % recycled asphalt content. In aspects of the present invention, the bitumen content is derived from at least about 40 wt %, at least about 45 wt %, or at least about 50 wt % recycled asphalt content. In preferred aspects, the bitumen content is derived from at least about 55 wt %, at least about 60 wt %, at least about 65 wt %, at least about 70 wt %, at least about 75 wt, at least about 80 wt %, at least about 85 wt %, at least about 90 wt %, or at least about 95 wt %.

It shall also be understood that the aspects of the asphalt mixture described herein can be "100% recycled asphalt content" mixtures, which is meant to describe aspects wherein (1) both the bitumen and aggregate are derived from about 100% recycled asphalt content, or the bitumen content is derived from about 100% recycled asphalt content, or the aggregate content is derived from about 100% recycled asphalt content (and in this aspect, the bitumen is derived from at least about 35 wt % recycled asphalt content).

Also described herein is a method of making the rejuvenated asphalt mixture comprising mixing a rejuvenator, bitumen, and aggregate to obtain a rejuvenated asphalt mixture, wherein the rejuvenator is present in an amount ranging from about 0.1-40 wt % by weight of bitumen and wherein the bitumen is derived from at least 35 wt % recycled asphalt content.

The asphalt mixture can be produced in various manufacturing configurations. For example, the asphalt mixture described herein can be produced at many temperatures typically ranging from 130-190 C and compacted at an asphalt application project site at temperatures typically ranging from 110-150 C. Specific ranges within this temperature range are commonly referred to as "hot mix" and "warm mix" temperatures. Additionally, with appropriate design, the asphalt mixtures can be produced at ambient temperatures to around 100 C temperatures and compacted at an asphalt application project site at around ambient temperatures. Such temperatures are commonly referred to as "cold mix" temperatures.

The rejuvenator described herein can be added in various ways and at various points in the production of the asphalt mixture. For example, the rejuvenator can be directly added to the bitumen, either virgin or recycled or both, at various points in the asphalt mixture production or added to the entire mixture of bitumen and aggregate.

In instances where the rejuvenator is first mixed with the bitumen (prior to the introduction of aggregate and other components), the "rejuvenating composition" (comprising both rejuvenator and bitumen) can be delivered directly as-is or can be delivered as an emulsion.

In one aspect, the asphalt mixture can be produced in a continuous drum process wherein recycled asphalt content, virgin aggregate, and/or virgin bitumen, are continuously added into the drum.

In another aspect, the asphalt mixture can be produced in a batch process wherein recycled asphalt content, virgin aggregate, and/or virgin bitumen, are weighed out separately and added into the drum to mix and produce individual batches of asphalt mixture.

In another aspect, the asphalt mixture can be produced in a pug mill wherein recycled asphalt content is introduced into pug mill bins and treated with the rejuvenator. This method is most commonly used for the production of cold mix asphalt.

In another aspect, the asphalt mixture can be "cold mix" produced in-place through incorporation of the rejuvenator onto unheated freshly milled recycled asphalt content. This method is commonly referred to as "cold in place recycling."

In another aspect, the asphalt mixture can be "hot mix" produced in-place through incorporation of the rejuvenator onto heated freshly milled recycled asphalt content. This method is commonly referred to as "hot in place recycling."

In the various aspects, the rejuvenator can be incorporated though various set ups. For example, a calibrated applications system (e.g., spray bar or injection system) can be installed on any point on an exist chute of the plant design. As another example, a calibrated applications system can be installed on any point of the recycled asphalt content transport system to the plant, such as on the conveyer belt. As another example, a calibrated applications system can be installed on the pug mill mixing chamber, if used. As another example, a calibrated applications system be installed that inline blends the rejuvenator into the bitumen transport line between the asphalt tank and the plant. The inline blending can be achieved using static blending or other mechanisms used for inline blending of liquids.

The recycled asphalt content can be incorporated without heating or through use of a heating chamber. In one example, heating the recycled asphalt content is achieved using indirect heating. Use of the unique heat stable rejuvenator allows the incorporation of the rejuvenator into the recycled asphalt content either before or after the heating process. The rejuvenator incorporation can be conveniently achieved by injection onto the recycled asphalt content immediately upon exiting the indirect heating chamber.

The asphalt mixture obtained from the various processes demonstrate high performance as it is resistant to cracking, moisture damage, oxidative aging, thermal degradation, and rutting. One skilled in the art will appreciate desirable performance characteristics vary by U.S. state and global jurisdictions. Further, one skilled in the art will appreciate each jurisdiction has a preferred method of measuring and determining such properties.

Herein, "failure energy", $G_f$, is referenced instead of any specific definition such as mode I fracture energy (the $G_{IC}$ parameter), as defined in Linear Elastic Fracture Mechanics [6]. Even at temperatures approaching the glass transition temperature ($T_g$), asphalt can exhibit viscoelastic behavior, thus depending on binder properties and distance of test temperature from the respective binder $T_g$, a portion of the work of failure is expected to correspond to elastic energy dissipated due to formation of new surfaces (crack propagation) and the remainder is dissipated through various mechanisms, most notably viscous dissipation. Herein "Failure Energy" is defined as the total area under the entire load-deflection (P-u) curve, divided by the area of the ligament, as shown in Equation (1) and FIG. 1, where $U_f$ is work of failure, $G_f$ is failure energy, P and u are the load and displacement, and $A_{lig}$ is the area of the ligament.

$$G_f = \frac{U_f}{A_{lig}} = \frac{\int P du}{A_{lig}} \qquad (1)$$

As failure properties for a viscoelastic material such as the asphalt mixtures described herein is dependent on loading rate and temperature, a standard set of conditions need to be defined to properly describe the "failure energy" parameter used in this document. For this purpose the deflection rate $$\left(\frac{du}{dt}\right)$$

is assumed to be 50 mm/min, with "u" defined as the bulk deflection in direction of the applied load P. The failure energy is measured under the entire P-u curve, including both pre-peak and post-peak behavior, as shown in FIG. 1.

The asphalt mixture described herein has a failure energy of at least 200 J/m$^2$ at −20° C., and can have a failure energy of at least 250 J/m$^2$ at 0° C., and can also have a failure energy of at least 300 J/m$^2$ at 25° C.

Cracking resistance of bitumen can be assessed through use of laboratory tests such as the Linear Amplitude Sweep using a Dynamic Shear Rheometer in accordance to AASHTO TP101 and bitumen moisture damage resistance can be measured using the Bitumen bond strength test following AASHTO T361. Oxidative aging can be assessed through use of the Pressure Aging Vessel (ASTM D6521) and the Rolling Thin Film Oven (ASTM D2872) for bitumen, and oven aging of the mixture at different temperatures and durations before testing using other performance tests to assess the loss of performance due to aging. Rutting can be measured using various dynamic creep tests using the Dynamic Shear Rheometery, such as AASHTO M315 and AASHTO M332. General rheological and viscoelastic properties can be measured using grading standards such as the Superpave Performance Grading (AASHTO M320), or the Penetration (ASTM D5) and Ring & Ball grading (ASTM D36) and their regional equivalents. Other methods include generation of "mastercurves" using a Dynamic Shear Rheometer following the principals of ASTM D7175. Cracking of bitumen and the ductile and brittle behavior at low temperatures is also influenced by the Glass Transition temperature, as measured using a Differential Scanning calorimeter (DSC) using the principals of ASTM D3418, ASTM D4419, ASTM E1858, or a dilatometric system.

For example, cracking resistance of the asphalt mixture can be assessed through use of laboratory cracking, damage, and fracture tests such as the Texas Overlay Tester (Tex-248-F, NJDOT B-10, or ASTM WK26816), various methods of the Semi-Circular Bending Test (SCB) (AASHTO TP-124, ASTM E1820, TR 330), Disc Compact Tension Test (DCT) (ASTM D7313), 4-point Bending Beam Fatigue (AASHTO T321, ASTM D7460, NEN-EN12697-24), and other performance tests developed for assessment of cracking and damage resistance such as the Direct Tension Cyclic Fatigue using Asphalt Mixture Performance Tester (AMPT) using (AASHTO TP107). As the low temperature side, the thermal stress and strain, and in special setups, the glass transition temperature can be measured using the Thermal Stress Restrained Strain Test (TSRST or the UTSST) (AASHTO TP10), as well as measurement of strength and compliance through Indirect Tensile (IDT) tests (AASHTO 6931, AASHTO T322).

The damage resistance tests described above can in a number of cases be related to the failure energy at various test temperatures, as is the case for the SCB, DCT, and IDT. In the other cases, the rate of damage propagation or failure strength can be indirectly related to the measured test properties, as is the case for the 4-point beam fatigue, TSRST, Direct Tension Cyclic Fatigue. Thus failure energy is an important underlying concept and parameter that unifies the various cracking and durability test methods. As the cracking performance is a critical aspect of performance for high-recycled content asphalt mixtures, the failure energy can be relied on as an important measure of significance in assigning "high performance" to an asphalt mixture.

The glass transition temperature is another material characteristic that is closely associated with the ductile-brittle behavior of the bitumen and asphalt mixture at low service temperatures. This parameter can be measured using the DSC or a dilatometric method, as described in the literature [7, 8]. A lower glass transition temperature indicates non-brittle behavior down to a lower temperature. Aging typically increases the glass transition temperature, thus effective rejuvenation to make a high performance mix will need to achieve a lower glass transition temperature. For the purpose of this document the "mixture Tg" is defined as the intersection between the liquid and glassy thermos-volumetric equilibrium line $$(\frac{\Delta V}{V_0} vs. T),$$

where T is temperature, V is the sample volume and $V_0$ is the initial volume at 25° C., measured at a constant cooling rate of 10° C./min.

The asphalt mixture described herein has a glass transition temperature of 0° C. or lower, and can have a mixture glass transition temperature of −5° C. or lower, and can have a glass transition temperature of −10° C. or lower, and can have a glass transition temperature of −15° C. or lower.

Moisture Damage can be assessed through use of the Tensile Strength Ratio (AASHTO T263, NEN-EN12697-12), Hamburg Wheeltracker (AASHTO T324), and the boiling test (ASTM D3625). Oxidative aging can be through various methods incorporating oven aging of the mixture at different temperatures and durations before testing, such as methods described in AASHTO R30 for short term and long term aging, using other performance tests to assess the loss of performance due to aging. Thermal degradation is the result of prolonged exposure to high temperatures, either due to long storage of the bitumen or the mixture at high temperatures. Although a standard test method does not exist, high temperature oven conditioning can provide a good representation of the effect. Rutting can be measured using various dynamic and static creep test (Flow Number and Flow Time) (AASHTO TP62, AASHTO TP79, NEN-EN12697-25), Hamburg Wheeltracker (AASHTO T324), and the Asphalt Pavement Analyzer (AASHTO T340). Other methods include generation of "mastercurves" using a Complex Modulus test (AASHTO T342) using either dedicated specialty equipment such as the Asphalt Mixture Performance Tester (AMPT), or retrofitted Universal Testing Machines. The examples highlight the various test standards by jurisdiction and generally demonstrate the asphalt mixture achieves desired performance across jurisdictions.

A high performing asphalt mixture can be defined as that which not only has high workability and compactability during production, but achieves high cracking resistance and durability against moisture and aging, while maintaining good resistance to rutting. The asphalt mixture described in this invention can be produced to meet and exceed the criteria of performance-based specification, also referred to as "balanced mix design", while incorporating 35% or higher recycled asphalt content. Regional agencies specify these criteria using the aforementioned test methods that although may vary by form, but essentially describe a similar system. For example, the asphalt mixture described herein can achieve less than 12.5 mm of rutting, as determined by the Hamburg or APA Wheeltracker test while achieving fracture energy (cracking resistance) higher than 400 J/m$^2$ using either the SCB or DCT test standard often used in North Central US (for example, Wisconsin, Illinois, and city of Chicago jurisdictions) and Northeastern US (for example New York State and New York City). As another example, the asphalt mixture can achieve greater than 100 cycles of cracking resistance using the overlay tester standard and less than 7 mm of rutting, as determined by the Asphalt Pavement Analyzer (APA) test standard used in the Northeastern and Southern US (for example, New Jersey and Texas). As another example, the asphalt mixture can achieve a tensile strength ratio greater than 80% as determined by NEN-EN12697-12 and beam fatigue resistance of $\varepsilon_6 > 100$ µm/m and NEN-EN12697-24, while maintaining less than 0.6 um/m/cycle of rutting, as determined by NEN-EN12697-25 test standard, often used by European jurisdictions (for example, the Netherlands).

Multiple Cycles of Recycling:

Using the rejuvenator as described herein, one can reuse the RAP in multiple aging and reuse cycles, and can further improve the treated material with each consecutive aging and rejuvenation cycle, ending up with material that can be considered to be superior in performance to that of the original asphalt binder. This is an innovative feature of the rejuvenator described hereine, relating directly to the rebalancing of the aged bitumen fractions with a properly engineered rejuvenating composition.

It has been common belief that RAP will deteriorate further with each cycle of use and aging, thus making the multiple cycles of RAP usage self-limiting. This has led to formation of large stockpiles of "unusable" RAP in some countries, such as Germany and France, due to excessive aging of RAP material. The rejuvenator as described herein eliminates this limitation, thus allowing for multiple reuses of the RAP by rejuvenating with the rejuvenators described herein during one or multiple cycles.

Furthermore, multiple aged and rejuvenated RAP provides a unique high quality and high-performance bitumen source, which can be utilize to build higher quality or more economical pavements when using such aged and rejuvenated bituminous material. Such mixes can be described as innovative, high-performance bituminous pavement compositions.

Use of RAP from Polymer-Modified Bitumen and Pavements

In recent years, an increasing share of pavements are being constructed using polymer modified bitumen, often referred to as PMB or PMA (polymer-modified asphalt). Such polymer may include but is not limited to thermoplastic elastomers such as Styrene-Butadiene Styrene (SBS), or other Styrene-based polymers and block co-polymers, latex, reactive terpolymers such as Elvaloy®, and waxes such as polyethelene and oxidized polyethelene, and rubber modification from ground tires or natural rubber sources. Furthermore the bitumen may contain polyamide waxes such as ethylene bistearamide and tristearamide, Montan wax, and Fischer-Tropsch wax, such as those produced by Sasol and marketed as Sasobit®.

In a few years it is predicted an increased amount of RAP will come from pavements that originally contained polymer modified bitumen as described above. Furthermore, it is a common belief that polymer modified pavement cannot contain a significant RAP content (often less than 10% by weight of the total mix), due to concerns that the bitumen contributed by the RAP will essentially "dilute" the PMB bitumen and result in an overall inferior bitumen and pavement performance.

RAP can also come from recycled porous asphalt pavement or can come from asphalt pavement treated with warm mix, antistrip, emulsifier and/or wax additives.

However, with proper rejuvenation of RAP (as described herein), especially RAP sourced from a PMB pavement, one can recapture much of the elasticity properties of the original PMB bitumen, thus allowing for preparation of unique and innovative, high-performance polymer-modified pavements incorporating higher RAP content. This is especially highlighted in Example 13.

EXAMPLES

The polymerized oil rejuvenators used in these examples are Cargill Anova® products (for example, Anova 1815), which are polymerized using sulfurization techniques.

Example 1: 36.7% RAP Binder Replacement Surface Course

A 36.7% RAP binder replacement base course was carried out in North Central US using a polymerized oil rejuvenator to prepare a polymer modified PG58-40 binder for use in the mixture. A 12.5 mm Nominal Maximum Aggregate Size (NMAS) was used. The mixture was designed in accordance to 3 million Equivalent Single Axle Loads (ESALs).

Binder and mixture performance tests were carried out on the mixes used for the mix design to determine compliance with local performance requirements. The mixtures were long term aged in accordance to AASHTO R30 before testing using the Disc Compact Tension (DCT) test was performed at −24° C. and compared against a 400 J/m² minimum threshold. The mixture showed significantly higher fracture energy, thus passed the requirements easily.

At the high temperature end, the Hamburg wheel tracking test was carried out at 50° C. against a 12.5 mm maximum allowable rut depth at 5000 cycles after AASHTO R30 Short term aging. Only relatively minor permanent deformation was observed, thus the mixture passed with a healthy margin. Mixture and binder performance test results are shown in Table 1.

TABLE 1

| Test Standard | Property Measured | Result | Specification |
|---|---|---|---|
| AASHTO R30 | Short Term Aging | — | 4 h at 135 ± 3° C. |
| AASHTO R30 | Long Term Aging | — | 120 h at 85 ± 3° C. |
| Disc Compact Tension | Cracking Resistance | 631.7 J/m² | >400 J/m² at −24° C. |
| AASHTO T324: Hamburg Wheel-tracker | Rutting | 3.18 mm | <12.5 mm at 5000 cycles |
| AASHTO M320 | Performance Grade | PG79.2-34 | Exceed PG58-34 |

Example 2: 45% RAP Mix Design for Surface Course

A surface course mix design was produced using a polymerized oil rejuvenator and virgin Pen 40/60 bitumen. The mix contained 45% RAP by total weight of the mixture, 33% of RAP (15% of the total mix) was sourced from porous asphalt, with the remaining RAP having been sourced from dense graded hot mix asphalt RAP. The porous asphalt RAP is commonly not reused in surface courses due to containing highly aged and oxidized bitumen.

The dosage of the polymerized oil rejuvenator was 2.5% by weight of total bitumen, or 0.15% of the total mixture weight, with Pen 40/60 virgin bitumen making up 3.80% of the total mix by weight, for a total binder content of 6.0% by weight of the mix.

Compacted Plates, beams and cylinders were made from this mixture and testing conform the European Standards for road building materials. The following standard specifications were utilized in testing of the mixture:

NEN-EN 12697-12+NEN-EN 12697-23: Determination of the indirect tensile strength and water sensitivity on cylindrical specimens of a bituminous mixture: Moisture Resistance NEN-EN 12697-25: Determination of the resistance to permanent deformation of cylindrical specimens of a bituminous mixture: Rutting NEN-EN 12697-26: Four point bending test on prismatic specimens: Stiffness NEN-EN 12697-24: Four point bending test on prismatic specimens: Fatigue Results are shown in Table 2 for the aforementioned tests. The results were compared to the requirements of the Netherland's "2015 RAW Standard", and were found to been in compliance for AC surface courses DL-A, B, and C (for bicycle, urban roads, and highways). These findings are of significant interest due to the uncommonly high content of highly aged porous asphalt RAP that was successfully utilized and rejuvenated to result in a high performance asphalt pavement surface course.

TABLE 2

| Test Standard | Property Measured | Result | Specification for AC surface DL-C |
|---|---|---|---|
| NEN-EN12697-12 | Moisture Resistance | TSR = 98% | Tensile Strength Ratio (TSR) > 80% |
| NEN-EN12697-25 | Rutting | Fc = 0.23 μm/m/cycle | <0.6 μm/m/cycle |
| NEN-EN12697-26 | Stiffness | 5.6 GPa | 5.5-11.0 GPa at 20° C., 8 Hz |
| NEN-EN12697-24 | Fatigue | ε6 = 151 μm/m | >100 μm/m |

Example 3: 45% RAP Surface Course

A high-RAP surface course pavement was carried out in Northeastern US using a polymerized oil rejuvenator. The mix contained 45% RAP by total weight of the mix. The binder phase consisted of 0.11% of Anova 1815 and 5.19% PG64-22 virgin bitumen for a total binder content of 5.3% by total weight of the mixture. A 9.5 mm Nominal Maximum Aggregate Size (NMAS) was used.

A control section was produced with a similar design containing only 45% RAP by weight of the mix, and 5.3% virgin PG64-22 binder, with no rejuvenator. The sections were cored and tested using the Asphalt Pavement Analyzer (APA) for rutting and the Overlay Tester (OT) for measuring cracking resistance.

The test results in Table 3 show that the sections without the rejuvenator showed no resistance to cracking, while addition of the rejuvenator significantly improved the number of cycles to cracking failure, thus achieving a passing performance. On the other hand, rutting was not significantly affected by the use of a rejuvenator. The results show the unique capability of the rejuvenated system described to achieve the target performance properties at higher than typical recycled content.

TABLE 3

| Test Standard | Property Measured | 45% RAP + Virgin Bitumen | 45% RAP + Rejuvenator | Specification Limit |
|---|---|---|---|---|
| NJDOT B-10: OT | Cracking Resistance | 8 cycles | 197 cycles | ≥150 cycles |
| AASHTO T-340: APA | Rutting | 4.8 mm | 4.9 mm | <7 mm |

Example 4: 45.9% RAP Binder Replacement Base Course

A 45.9% RAP binder replacement base course was carried out in North Central US using a polymerized oil rejuvenator to prepare a polymer modified PG58-40 binder for use in the mixture. A 19 mm Nominal Maximum Aggregate Size (NMAS) was used. The mixture was designed in accordance to 3 million Equivalent Single Axle Loads (ESALs).

Binder and mixture performance tests were carried out on the mixes used for the mix design to determine compliance with local performance requirements. The mixtures were long term aged in accordance to AASHTO R30 before testing using the Disc Compact Tension (DCT) test was performed at −24° C. and compared against a 400 J/m$^2$ minimum threshold. The mixture showed significantly higher fracture energy, thus passed the requirements easily.

At the high temperature end, the Hamburg wheel tracking test was carried out at 50° C. against a 12.5 mm maximum allowable rut depth at 5000 cycles after AASHTO R30 Short term aging. Only relatively minor permanent deformation was observed, thus the mixture passed with a healthy margin. Mixture and binder performance test results are shown in Table 4.

TABLE 4

| Test Standard | Property Measured | Result | Specification |
|---|---|---|---|
| AASHTO R30 | Short Term Aging | — | 4 h at 135 ± 3° C. |
| AASHTO R30 | Long Term Aging | — | 120 h at 85 ± 3° C. |
| Disc Compact Tension | Cracking Resistance | 593.6 J/m$^2$ | >400 J/m$^2$ at −24° C. |
| Hamburg Wheel-tracker | Rutting | 2.05 mm | <12.5 mm at 5000 cycles |
| AASHTO M320 | Performance Grade | PG79.1-34 | Exceed PG58-34 |

Example 5: 45% RAP+5% RAS Surface Course

A high-RAP and RAS surface course pavement was carried out in Northeastern US using a polymerized oil rejuvenator. The mix contained 45% RAP by total weight of the mix. The binder phase consisted of 0.42% of Anova 1815 and 4.88% PG64-22 virgin bitumen for a total binder content of 5.3% by total weight of the mixture. A 9.5 mm Nominal Maximum Aggregate Size (NMAS) was used. The use of a high amount of recycled shingle asphalt was very noteworthy in this design, as the highly oxidized and further aged RAS bitumen poses a significant challenge in terms of achieving high pavement cracking performance.

A control section was produced with a similar design containing only 45% RAP by weight of the mix, and 5.3% virgin PG64-22 binder, with no rejuvenator. The sections were cored and tested using the Asphalt Pavement Analyzer (APA) for rutting and the Overlay Tester (OT) for measuring cracking resistance.

The test results in Table 5 show that the sections without the rejuvenator showed no resistance to cracking, while addition of the rejuvenator significantly improved the number of cycles to cracking failure, thus achieving a passing performance. On the other hand, rutting was not significantly affected by the use of a rejuvenator. The results show the unique capability of the rejuvenated system described to achieve the target performance properties at higher than typical recycled content.

TABLE 5

| Test Standard | Property Measured | 45% RAP + 5% RAS + Virgin Bitumen | 45% RAP + 5% RAS + Rejuvenator | Specification Limit |
| --- | --- | --- | --- | --- |
| NJDOT B-10:OT | Cracking Resistance | 4 cycles | 169 cycles | ≥150 cycles |
| AASHTO T-340: APA | Rutting | 5.1 mm | 4.2 mm | <7 mm |

Example 6: 67% RAP Mix Design for Base Course

A base course mix design was produced using a polymerized oil rejuvenator and virgin Pen 70/100 bitumen. The mix contained 67% RAP by total weight of the mixture, 33% of RAP (29% of the total mix) was sourced from porous asphalt, with the remaining RAP having been sourced from dense graded hot mix asphalt RAP. The porous asphalt RAP is commonly not reused in surface courses due to containing highly aged and oxidized bitumen.

The dosage of the rejuvenator was 5.0% by weight of total bitumen, or 0.21% of the total mixture weight, with Pen 40/60 virgin bitumen making up 0.84% of the total mix by weight, for a total binder content of 4.3% by weight of the mix.

The mixture was compared to a reference composition in which the rejuvenated combination of rejuvenator and Pen 70/100 bitumen was replaced with a non-rejuvenated soft Pen 160-220 virgin bitumen. The rejuvenated bitumen compositions and the virgin soft bitumen had similar penetration grades.

Compacted Plates, beams and cylinders were made from this mixture and testing conform the European Standards for road building materials. The following standard specifications were utilized in testing of the mixture:

NEN-EN 12697-12+NEN-EN 12697-23: Determination of the indirect tensile strength and water sensitivity on cylindrical specimens of a bituminous mixture: Moisture Resistance NEN-EN 12697-25: Determination of the resistance to permanent deformation of cylindrical specimens of a bituminous mixture: Rutting NEN-EN 12697-26: Four point bending test on prismatic specimens: Stiffness NEN-EN 12697-24: Four point bending test on prismatic specimens: Fatigue Results are shown in Table 6 for the aforementioned tests. The results were compared to the requirements of the Netherland's "2015 RAW Standard", and were found to been in compliance for AC base courses DL-A, B, C, and IB (for bicycle, urban roads, highways, and industrial roads).

These findings are of significant interest due to the uncommonly high content of recycled bitumen, especially that of the highly aged porous asphalt RAP that was successfully utilized and rejuvenated to result in a high performance asphalt pavement surface course.

Furthermore, the results of the mix containing the soft non-rejuvenated virgin bitumen show that although this composition met the fatigue requirements with a relatively narrow margin, it was unable to meet the "rutting" requirements due to over-softening of the mixture. On the other hand, the mixture using the rejuvenator met both the fatigue and rutting requirements with a wide margin.

TABLE 6

| Test Standard | Property Measured | 67% RAP + Rejuvenator | 67% RAP + Soft Bitumen | Specification for AC Base OL-IB |
| --- | --- | --- | --- | --- |
| NEN-EN12697-12 | Moisture Resistance | TSR = 93% | TSR = 80% | Tensile Strength Ratio (TSR) > 80% |
| NEN-EN12697-25 | Rutting | Fc = 0.13 µm/m/cycle | Fc = 0.4 µm/m/cycle | <0.2 µm/m/cycle |
| NEN-EN12697-26 | Stiffness | 9.0-9.5 GPa | 8.0 GPa | 7.0-14.0 GPa at 20° C., 8 Hz |
| NEN-EN12697-24 | Fatigue | ε6 = 115-130 µm/m | ε6 = 105 µm/m | >90 µm/m |

Example 7: 76% RAP and Recycled Aggregate Base Course

A base course mix design was produced using a polymerized oil rejuvenator and virgin Pen 70/100 bitumen. 100% of the aggregate used in the mix was sourced from recycled material, as follows:

76.43% by total weight of the mixture consisted of various RAP material, with 28.68% of the total mix having been sourced from porous asphalt RAP, and the remaining RAP having been sourced from dense graded hot mix asphalt RAP.

22.95% by total weight of mix consisted of a blend of mineral aggregate sourced from roadbed railway tracks ("Rebeas grit"), as well as grit and sand from incinerator tar asphalt ("Ecogrit" and "Ecosand").

The dosage of the rejuvenator was 5.0% by weight of total bitumen, or 0.24% of the total mixture weight, with Pen 70/100 virgin bitumen making up 0.38% of the total mix by weight, for a total binder content of 4.3% by weight of the mix.

Compacted Plates, beams and cylinders were made from this mixture and testing conform the European Standards for road building materials. The following standard specifications were utilized in testing of the mixture:

NEN-EN 12697-12+NEN-EN 12697-23: Determination of the indirect tensile strength and water sensitivity on cylindrical specimens of a bituminous mixture: Moisture Resistance NEN-EN 12697-25: Determination of the resistance to permanent deformation of cylindrical specimens of a bituminous mixture: Rutting NEN-EN 12697-26: Four point bending test on prismatic specimens: Stiffness NEN-EN 12697-24: Four point bending test on prismatic specimens: Fatigue Results are shown in Table 7 for the aforementioned tests. The results were compared to the requirements of the Netherland's "2015 RAW Standard", and were found to been in compliance for AC base courses DL-A, B, C, and IB (for bicycle, urban roads, highways, and industrial roads). These findings are of significant interest due to the uncommonly high content of recycled bitumen and recycled aggregate, especially that of the highly aged porous asphalt RAP that was successfully utilized and rejuvenated to result in a high-performance asphalt pavement surface course.

TABLE 7

| Test Standard | Property Measured | Result | Specification for AC Base OL-C |
|---|---|---|---|
| NEN-EN12697-12 | Moisture Resistance | TSR = 90% | Tensile Strength Ratio (TSR) > 80% |
| NEN-EN12697-25 | Rutting | Fc = 0.20 μm/m/cycle | ≤0.4 μm/m/cycle |
| NEN-EN12697-26 | Stiffness | 7.4 GPa | 7.0-14.0 GPa at 20° C., 8 Hz |
| NEN-EN12697-24 | Fatigue | ε6 = 108 μm/m | >90 μm/m |

Example 8: 100% RAP Surface Course

A 100% RAP project was carried out a polymerized oil rejuvenator. The mixture consisted of a fractionated RAP and approximately 0.27% Anova 1815 rejuvenator (by weight of the mixture). The rejuvenator was applied to the heated RAP upon exiting the drum and transported to the job site without any additional residence time.

The pavement was cored within a few days of the completion of the project and samples were sent for mixture performance testing in accordance to NYC surface pavement specification. The results show that mixture passed both the cracking (semi-circular bending test) and the rutting (Hamburg wheel tracking) requirements, as shown in Table 8.

TABLE 8

| Test Standard | Property Measured | Result | Specification |
|---|---|---|---|
| AASHTO R30 | Short Term Aging | — | 4 h at 135 ± 3° C. |
| Semi Circular Bending | Cracking Resistance | 500 J/m$^2$ | ≥500 J/m$^2$ at 25° C. |
| AASHTO T324: Hamburg Wheel-tracker | Rutting | 4.7 mm | <12.5 mm at 10000 cycles |
| ASTM D6927: Marshall Stability | Rutting | 1584 lbf | >1500 lbf at 60° C. |
| ASTM D6927: Marshall Flow | Ductility | 11.3 | 8.0-12.0 [0.01 in] |

Example 9: Rejuvenator Fractionation of Modified Oil Blend #1

The rejuvenator was tested and fractionated using the previously described fractionation method to measure Asphaltenes as n-Heptane insolubles, as defined in ASTM D3279, and the Iatroscan MK-6S thin-layer chromatography method for fractionation of the n-Heptane soluble fraction. The rejuvenator comprised:
  59.0% by weight of a modified biorenewable oil with 70.8% oligomer
  41.0% by weight of straight soybean oil
  The rejuvenating composition had an overall oligomer content of 46.31% and a Hildebrandt solubility of 8.69.
  The fractionation results show a sizable fraction corresponding to the "resin" fraction, using the same fractionation method used for determining the major bitumen fractions.

| Fraction | Saturates | Cyclics | Resins | Asphaltene |
|---|---|---|---|---|
| % wt | 0.2% | 38.6% | 61.2% | 0.0% |

Example 10: Rejuvenator Fractionation of Modified Oil Blend #2

The following rejuvenator was tested and fractionated using the previously described fractionation method to measure Asphaltenes as n-Heptane insolubles, as defined in ASTM D3279, and the Iatroscan MK-6S thin-layer chromatography method for fractionation of the n-Heptane soluble fraction.
The rejuvenator comprised:
  14.5% by weight of a modified biorenewable oil with 70.8% oligomer.
  85.5% by weight of straight soybean oil
  The rejuvenating composition had an overall oligomer content of 16.59% and a Hildebrandt solubility of about 8.60.
  The fractionation results show a sizable fraction corresponding to the "resin" fraction, using the same fractionation method used for determining the major bitumen fractions.

| Fraction | Saturates | Cyclics | Resins | Asphaltene |
|---|---|---|---|---|
| % wt | 0.2% | 63.1% | 36.7% | 0.0% |

Example 11: Rejuvenator Fractionation of Modified Oil Blend #3

The following rejuvenator was tested and fractionated using the previously described fractionation method to measure of Asphaltenes as n-Heptane insolubles, as defined in ASTM D3279, and the Iatroscan MK-6S thin-layer chromatography method for fractionation of the n-Heptane soluble fraction. The rejuvenator comprised of a modified biorenewable oil synthesized to a 17.7% oligomer content and a Hildebrandt solubility of about 8.57.

The fractionation results show a sizable fraction corresponding to the "resin" fraction, using the same fractionation method used for determining the major bitumen fractions.

| Fraction | Saturates | Cyclics | Resins | Asphaltene |
|---|---|---|---|---|
| % wt | 0.0% | 45.5% | 53.5% | 1.0% |

Example 12: Multiple Cycles of Recycling

This example demonstrates multiple aging and rejuvenation cycles of common paving grade bitumen, showing how with each cycle a bitumen with superior performance grade and rheological properties is achieved.

In this example the following definitions are used: UTI: Useful Temperature Interval, as the difference between the high temperature performance grade and the low temperature performance grade, as determined using AASHTO M320. HT-PG: The High Temperature Performance Grade of the asphalt binder as measured by controlling the |G*|/sin δ parameter at high service temperatures at each aging condition using a Dynamic Shear Rheometer (DSR) following ASTM D7175 and AASHTO M320. I-PG: The Intermediate Temperature Performance Grade of the asphalt binder as measured by controlling the |G*|sin δ parameter at intermediate service temperatures at each aging condition using a Dynamic Shear Rheometer (DSR) following ASTM D7175 and AASHTO M320. S-Grade: The Low Temperature Performance Grade controlled by the Creep Stiffness parameter ("S"), measured using a 4-mm spindle DSR setup utilizing a liquid nitrogen cooling system, following the guidance of ASTM D6648 and AASHTO M320. m-Grade: The Low Temperature Performance Grade controlled by the Creep Rate parameter ("m" value), measured using a 4-mm spindle DSR setup utilizing a liquid nitrogen cooling system, following the guidance of ASTM D6648 and AASHTO M320.

A PG64-22 virgin bitumen, sourced from Flint Hills refinery, was used demonstrate the effect of multiple aging and rejuvenation on a common paving grade bitumen. The bitumen was aged in accordance to AASHTO M320 and associated standards by first aging with Rolling Thin Film oven (RTFO) followed by 20 hrs of aging at 100° C. under 2.1 MPa of air pressure in the Pressure Aging Vessel (PAV) to simulate 7-10 years of field performance. At this stage the bitumen was considered to be representative of a typical RAP bitumen after 1 cycle of use and was graded. The bitumen was then treated with 3% by weight of the rejuvenator described in example #10 (Modified Oil Blend #2, or MOB2) and graded again, followed by another 20 hr cycle of PAV aging and subsequent grading. Once again the bitumen was rejuvenated and graded before subjecting to a $3^{rd}$ cycle of PAV aging and rejuvenation.

Figure 3:
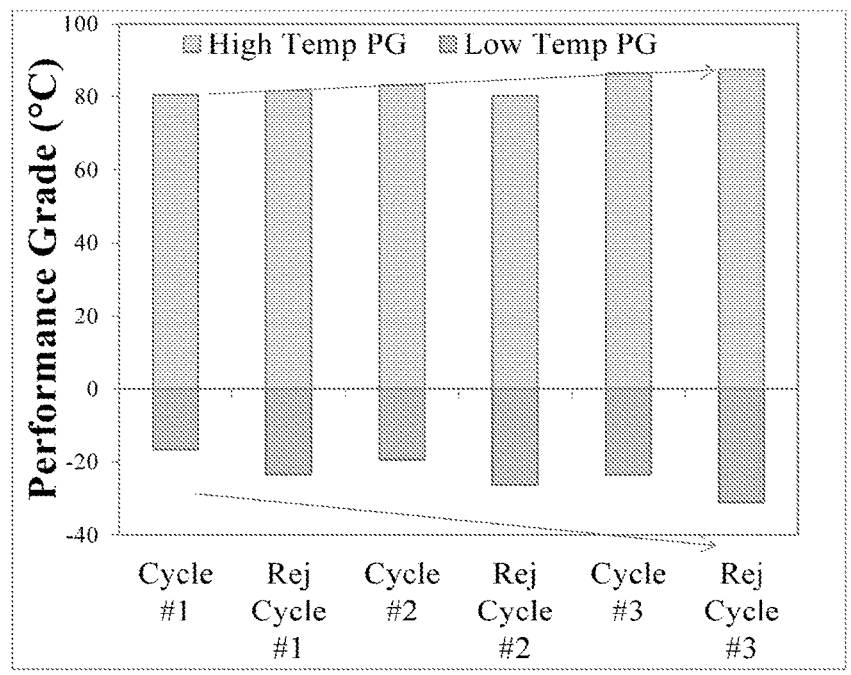
FIG. 3 shows that the trend of multiple cycles of aging and rejuvenation resulting in a unique and innovative binder with both an improved high temperature and an improved low temperature performance grade.
Figure 4:
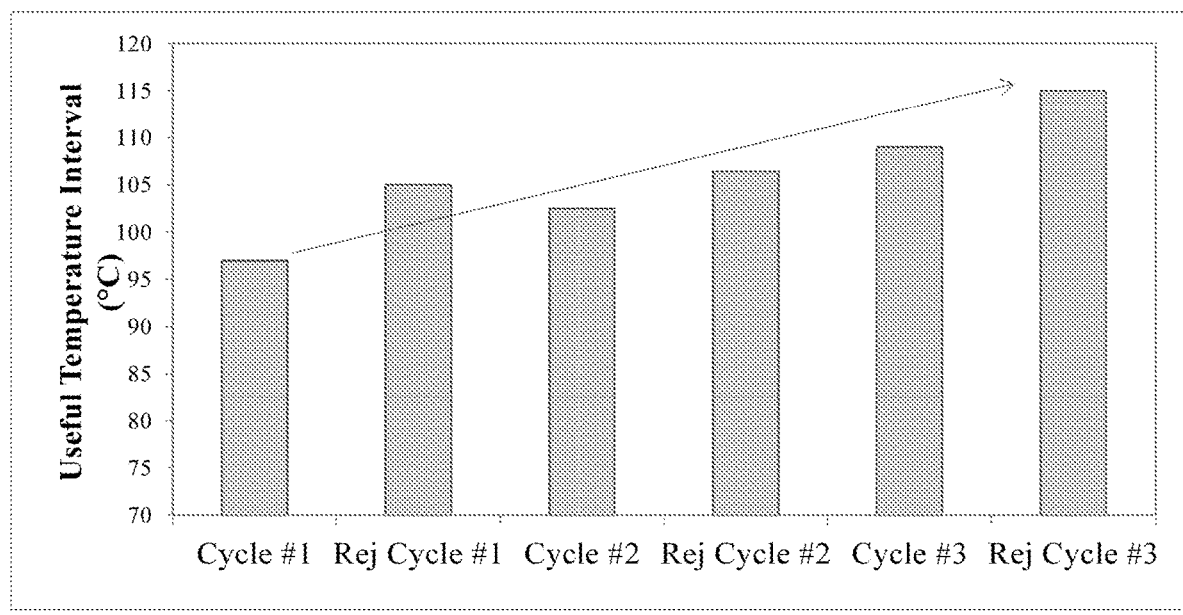
FIG. 4 shows a significant enhancement of the useful temperature interval over multiple cycles of aging and rejuvenation.

The results are shown in the following table. FIG. 3 shows that the trend of multiple cycles of aging and rejuvenation resulted in a unique and innovative binder with both an improved high temperature and an improved low temperature performance grade. This is also demonstrated by the significant enhancement of the UTI, as shown in FIG. 4, with each cycle. The final blend represents a significant improvement in terms of the applicable performance and allowable temperature range.

| Binder Description | hrs of PAV Aging | UTI ° C. | HT PG ° C. | I-PG ° C. | S-BBR ° C. | m-BBR ° C. |
|---|---|---|---|---|---|---|
| Cycle #1: RTFO and PAV Aged PG64-22 | 20 | 97.0 | 80.4 | 27.4 | −16.6 | −20.4 |
| Rej Cycle #1: 97% Cycle #1 + 3% MOB2 | 20 | 105.0 | 81.6 | 20.5 | −23.4 | −25.8 |
| Cycle #2: PAV aging of "Rej Cycle #1" | 40 | 102.5 | 83.1 | 26.3 | −19.4 | −21.1 |
| Rej Cycle #2: 97% Cycle #2 + 3% MOB2 | 40 | 106.4 | 80.2 | 19.9 | −26.2 | −28.2 |
| Cycle #3: PAV aging of "Rej Cycle #2" | 60 | 109.0 | 86.4 | 24.2 | −23.5 | −22.6 |
| Rej Cycle #3: 97% Cycle #3 + 3% MOB2 | 60 | 115.0 | 87.5 | 18.2 | −31.1 | −27.5 |

Example 13: Using RAP Already Incorporating Polymer

The performance of polymer modified asphalt is nowadays commonly benchmarked using the Multiple Stress Creep and Recovery test (MSCR) using a Dynamic Shear Rheometer. The test procedure is described in AASHTO T350 and consists of a series of short creep loading periods followed by a longer "recovery" period. Performance is assessed using multiple parameters, most notable the "percent of recovery" due to the elasticity of the established polymer network in the bitumen In this example an SBS-modified PMA (polymer modified asphalt) sourced from Northeastern USA was used to demonstrate the impact of rejuvenating aged RAP sourced from polymer modified asphalt pavements. The PMA was graded as a PG64V-22 in accordance to AASHTO M332.

The sample was conditioned in the RTFO and tested in accordance to AASHTO T350 at 25, 58, 64, and 70° C. The high temperature performance grade (HT-PG) was also measured and reported at each of these conditions. The sample was then subjected to PAV aging for 20 hr at 2.1 MPa air pressure and 100° C. to simulate 7-10 years of field aging, representing the conditions of a RAP bitumen, followed by treating with two dosages of the rejuvenator described in example #10 (MOB2).

The results shown in the table below indicate that the rejuvenated aged PMA was able to maintain (and exceed) the elasticity of that of the original PMA prior to going through simulated field aging.

One skilled in the art may argue that these results are simply due to the increased stiffness of the aged PMA at the tested temperatures, as inferred from the increased HT-PG. To satisfy such questions, the % recovery was also predicted through interpolation for each of the conditions to represent that at a "equi-viscous" temperature. The equi-viscous temperature was chosen as that equivalent to the performance of the RTFO-aged control at 64° C. The e results show a clear improvement over that of original PMA, indicating a superior PMA contribution from the rejuvenated RAP sourced from a PMA. Such results are of significant economic importance as it indicates the potential to utilize the present invention to achieve significant economic savings and performance boost through incorporation of a higher content of rejuvenated PMA RAP in pavements specifying polymer-modification or performance typically associated with a low-RAP PMA pavement.

| | | PMA Condition | | |
|---|---|---|---|---|
| Test Type | Test Temperature ° C. | RTFO Aged | RTFO + PAV + 3% MOB2 | RTFO + PAV + 5% MOB3 |
| HT-PG | Varies | 76.8° C. | 91.39° C. | 88.23° C. |
| MSCR % R at 3.2 kPa | 25 | 77.2% | 88.5% | 86.6% |
| | 58 | 61.3% | 78.5% | 76.5% |
| | 64 | 49.5% | 74.4% | 71.2% |
| | 70 | 33.5% | 67.1% | 61.2% |
| | Equi-viscous | 49.5% | 66.3% | 60.8% |

Example 14: Treating High Content of Recycled Asphalt Shingle Bitumen

Recycled Asphalt Shingles (RAS) are a source of recycled bitumen that have been used at various levels in the industry. Due to the extreme level of air-blowing that roofing bitumen undergo before usage in shingles, concern with premature cracking and durability issues has existed with the excessive use of such bitumen sources in pavements, resulting in usage limitations in many jurisdictions. With the advent of performance-based designs and specifications, efforts have been made to find performance based criteria to designate acceptable levels of RAS usage in pavements. One such parameter is the $\Delta Tc$, which is defined as the difference between the S-grade and the m-grade of the final bitumen after either 20 or 40 hrs of PAV aging, as defined by AASHTO M320. A more negative $\Delta Tc$ value is perceived to indicate lower compatibility and higher chances for premature durability issues.

The rejuvenating compounds described in this invention have the ability to improve the $\Delta Tc$ values for binders containing high levels of RAS bitumen, while also enhancing the overall performance of the resulting bitumen, especially in terms of low temperature performance and relaxation, as demonstrated in this example. A PG64-22 virgin binder sourced from Flint Hills refinery was blended with 25% by weight of extracted RAS bitumen. The blend was then treated with successively higher dosages of the rejuvenator described in example #10 (MOB2). The results, as shown in the table below, indicate an improving trend with the increasing dosage of MOB2, along with a clear improvement in the low temperature performance, especially the m-grade.

Furthermore, the UTI of the rejuvenated RAS-containing bitumen has also increased, demonstrating a uniquely high performance rejuvenating aged bitumen blend, meeting the requirements of a PG64-28 binder, which is considered a premium grade in comparison to the PG64-22 virgin binder used as the starting material. This unique high-performance rejuvenated recycled bitumen blend is another example of the unique ability of this invention to deliver a high-value bitumen source for use in various industries utilizing bituminous compositions.

| Binder Description | Rejuvenator Content | UTI ° C. | HT-PG (unaged) ° C. | HT-PG (RTFO) ° C. | S-Grade ° C. | m-Grade ° C. | $\Delta Tc$ ° C. |
|---|---|---|---|---|---|---|---|
| 100% Base Binder | 0 | 89.1 | 65.5 | 66.4 | −23.7 | −23.6 | −0.1 |
| 75% Base Binder: 25% RAS | 0 | 93.4 | 71.7 | 72.9 | −24.2 | −21.7 | −2.5 |
| +1% MOB2 | 1 | 93.4 | 69.9 | 71.6 | −25.1 | −23.5 | −1.6 |
| +2% MOB2 | 2 | 94.9 | 68.3 | 69.6 | −28.2 | −26.6 | −1.6 |
| +3% MOB2 | 3 | 94.5 | 66.3 | 68.2 | −29.0 | −28.2 | −0.8 |

Example 15: Aging Resistance of the Rejuvenating Oils

As discussed earlier, a suitable rejuvenator as described in this invention would replenish the fractions of aged bitumen. Therefore it is reasonable to expect the rejuvenating oil to be able to tolerate and perform under the same thermal and oxidative conditions as that which the bitumen and asphalt is subject to during production and service. These conditions are standardly simulated and tested in the laboratory following the framework laid out in AASHTO M320, that is the bitumen is short term aged using Rolling Thin Film oven (RTFO) at 163° C. for 85 minutes, and long term aged through 20 hrs of aging at 90 to 110° C. under 2.1 MPa of air pressure in the Pressure Aging Vessel (PAV). Short term aging of the bitumen has also been tested using the Thin Film Oven (TFO) aging following ASTM D1754, at 163° C. for 5 hrs minutes. The RTFO test procedure was designed to be approximately equivalent to the TFO procedure.

In the current example, rejuvenating oils are subjected to 20 hrs of aging at 100° C. under 2.1 MPa of air pressure in the Pressure Aging Vessel (PAV) following ASTM D6521. The oils were tested for viscosity at 60° C. using a Brookfield viscometer following ASTM D4402. Furthermore, samples were subjected to Pressure Differential Scanning calorimetry testing using a TA DSC 2920, by holding the sample at 130° C. under an oxygen purge and measuring the oxidation induction time (OIT). Longer onset times indicate higher resistance to oxidation.

| # | Oil Description | PDSC OIT at 130° C. | Viscosity at 60° C., SP#21 (cP) | | |
|---|---|---|---|---|---|
| | | | Unaged | After PAV | % Increase |
| 1 | MOB2 | 23 min | 27 | 29.25 | 8% |
| 2 | MOB3 | — | 17.75 | 46.25 | 161% |
| 3 | SylvaRoad RP1000 | <5 min | 22.75 | 7975 | 34955% |
| 4 | Evoflex CA3 | <5 min | — | — | — |
| 5 | Refined Soybean Oil | 11 min | 16.25 | 1515 | 9223% |
| 6 | Recovered Corn Oil | 11 min | 15.25 | 542 | 3454% |
| 7 | Crude Degummed Soybean Oil | — | 15.75 | 1070 | 6694% |
| 8 | Refined Sunflower Oil | — | 18 | 1603 | 8806% |

The results show that vegetable oil blends polymerized using the sulfurization (MOB 2 and MOB3) had the least increase in viscosity as a result of the PAV aging process, whereas the impact on unmodified vegetable oils and tested commercial asphalt additives showed increases in viscosity ranging from 1 to 3 orders of magnitude. This trend is also demonstrated using the PDC, in which the MOB2 oil has significantly longer oxidation induction times compared to the other tested oil systems, further demonstrating oxidative stability. This oxidative stability is essential in rejuvenator applications as it indicates the longevity of the impact of the rejuvenating oil on the performance of the rejuvenated bituminous composition.

Example 16: Improving Aging Resistance of the Vegetable Oil Asphalt Additives Using Antioxidants For the purpose of this invention it was also envisioned that use of antioxidants can be beneficial in achieving similar resistance to age hardening, provided that the correct dosage and type is used. A loss of solubility is observed when antioxidant dosages exceed 1-2% by weight of the vegetable oil, thus the preferred embodiment would use enough antioxidant to achieve 200% of lower increase in viscosity at 60° C., while maintaining solubility in the oil.

As in example #15, the oils were subjected to 20 hrs of aging at 100° C. under 2.1 MPa of air pressure in the Pressure Aging Vessel (PAV) following ASTM D6521. The oils were tested for viscosity at 60° C. using a Brookfield viscometer following ASTM D4402. Furthermore, samples were subjected to Pressure Differential Scanning calorimetry testing using a TA DSC 2920, by holding the sample at 130° C. under an oxygen purge and measuring the oxidation induction time.

In the following table three types of antioxidants were used in combination with recovered corn oil. Other modified and non-modified biorenewable may be optimized in the same way using antioxidants, including but not limited to those used in the present example.

| # | Oil Description | PDSC OIT at 130° C. | Viscosity at 60° C., SP#21 (cP) | | |
|---|---|---|---|---|---|
| | | | Unaged | After PAV | % Increase |
| 1 | Recovered Corn Oil (RCO) | 11 min | ~15.3 | 542 | 3454% |
| 2 | RCO + 0.2% BHT | — | | 338 | 2116% |
| 3 | RCO + 0.66% BHT | 28 min | | 32 | 110% |
| 4 | RCO + 0.66% BNX1010 | 26 min | | 22 | 44% |
| 5 | RCO + 0.66% Irgafos 168 | — | | 364 | 2287% |

REFERENCES

[1] C. Petersen, "A Review of the Fundamentals of Asphalt Oxidation: Chemical, Physicochemical, Physical Property, and Durability Relationships," Transportation Research Board, Washington D.C., 2009.

[2] C. Petersen and R. Glaser, "Asphalt Oxidation Mechanisms and the Role of Oxidation Products on Age Hardening Revisited," *Road Materials and Pavement Design*, vol. 12, pp. 795-819, 2011.

[3] S. Priyanto, G. Mansoori and A. Suwono, "Measurement of property relationships of nano-structure micelles and coacervates of asphaltene in a pure solvent," *Chemical Engineering Science*, vol. 56, p. 6933-6939, 2001.

[4] D. Christensen and D. Anderson, "Chemical-Physical Property Relationships for Asphalt Cements and the Dispersed Fluid Model," in *Proceedings of the Trasportation Research Board*, Washington D.C., 1992.

[5] T. Yeh, "Colloidal Aspect of a Macrostructure of Petroleum Asphalt," *FUEL SCIENCE & TECHNOLOGY INTERNATIONAL*, vol. 10, no. 4, pp. 723-733, 1992.

[6] H. Tabatabaee and H. Bahia, "Establishing Use of Binder Cracking Tests for Prevention of Pavement Cracking," *Submitted to the Journal of the Association of Asphalt Paving Technologists*, 2014.

[7] H. Tabatabaee, R. Velasquez and H. Bahia, "Predicting Low Temperature Physical Hardening in Asphalt Binders," *Submitted for publication in the Journal of Construction and Building Materials*, 2012.

[8] H. Bahia, H. Tabatabaee and R. Velasquez, "Asphalt Thermal Cracking Analyzer," in *7th International Conference on Cracking in Pavements*, Netherlands, 2012.

The invention claimed is:

1. A method, comprising:
   mixing a rejuvenator, bitumen, and aggregate to obtain an asphalt mixture, wherein the bitumen is 3 wt % to 7 wt % of the asphalt mixture;
   wherein the rejuvenator is a polymerized oil that is polymerized via sulfurization, and the rejuvenator comprises 0.5-5 wt % by weight of the bitumen,
   wherein at least 35 wt % of the bitumen is derived from recycled asphalt content, and
   wherein the asphalt mixture achieves less than 12.5 mm of rutting as determined by Hamburg Wheeltracker test standard in accordance with AASTHO T 324.

2. The method of claim 1, wherein the polymerized oil is derived from a biorenewable oil source.

3. The method of claim 1, wherein the asphalt mixture achieves a mixture Tg of 0° C. or lower.

4. The method of claim 1, wherein the recycled asphalt content has been recycled more than once.

5. The method of claim 1, wherein 100 wt % of bitumen is derived from recycled asphalt content.

6. The method of claim 1, wherein the recycled asphalt content is either recycled asphalt pavement or recycled asphalt shingles or asphalt resulting from a solvent de-asphalting process.

7. The method of claim 1, wherein the recycled asphalt content comes from pavement treated with warm mix, antistrip, emulsifier, and/or wax additives.

8. The method of claim 1, wherein the asphalt mixture achieves a mixture Tg of −10° C. or lower.

9. The method of claim 1, wherein the rejuvenator has a Hildebrandt Solubility parameter ranging from 6 to 12.

10. The method of claim 1, further comprising using the asphalt mixture for roofing applications.

11. A rejuvenated asphalt, comprising:
a rejuvenator, bitumen, and aggregate, wherein the bitumen is 3 wt % to 7 wt % of the rejuvenated asphalt;
wherein the rejuvenator is a polymerized oil that is polymerized via sulfurization, and the rejuvenator is present in an amount ranging from about 0.5-5 wt % by weight of the bitumen,
wherein at least 35 wt % of the bitumen is derived from recycled asphalt content, and
wherein the rejuvenated asphalt achieves less than 12.5 mm of rutting as determined by Hamburg Wheeltracker test standard in accordance with AASTHO T 324.

12. The asphalt of claim 11, wherein 100 wt % of bitumen is derived from recycled asphalt content.

13. The asphalt of claim 11, wherein the rejuvenator has an increase in 60° C. viscosity increase of 300% or less after aging at 100° C. in the Pressure Aging Vassal for 20 hrs at 2.1 MPa air pressure, compared to the unaged rejuvenator.

14. The asphalt of claim 11, wherein the rejuvenator replenishes the resin fraction and has an oxidation induction time of 15 minutes or longer at 130° C.

15. The asphalt of claim 11, wherein the rejuvenator replenishes the resin fraction and has an increase in 60° C. viscosity increase of 300% or less after aging at 100° C. in the Pressure Aging Vassal for 20 hrs at 2.1 MPa air pressure, compared to the unaged rejuvenator.

16. The asphalt of claim 11, wherein the rejuvenator has a Hildebrandt solubility parameter of about 6 to about 12 and has an oxidation induction time of 15 minutes or longer at 130° C.

17. The asphalt of claim 11, wherein the rejuvenator has a Hildebrandt solubility parameter of about 6 to about 12 and has an increase in 60° C. viscosity increase of 300% or less after aging at 100° C. in the Pressure Aging Vassal for 20 hrs at 2.1 MPa air pressure, compared to the unaged rejuvenator.

18. The asphalt of claim 11, wherein the rejuvenator consists of the polymerized oil and replenishes the resin fraction and has an oxidation induction time of 15 minutes or longer at 130° C.

19. The asphalt of claim 11, wherein the rejuvenator consists of the polymerized oil and replenishes the resin fraction and has an increase in 60° C. viscosity increase of 300% or less after aging at 100° C. in the Pressure Aging Vassal for 20 hrs at 2.1 MPa air pressure, compared to the unaged rejuvenator.

20. The asphalt of claim 11, wherein the rejuvenator consists of the polymerized oil and has a Hildebrandt solubility parameter of about 6 to about 12 and has an oxidation induction time of 15 minutes or longer at 130° C.

21. The asphalt of claim 11, wherein the rejuvenator consists of the polymerized oil and has a Hildebrandt solubility parameter of about 6 to about 12 and has an increase in 60° C. viscosity increase of 300% or less after aging at 100° C. in the Pressure Aging Vassal for 20 hrs at 2.1 MPa air pressure, compared to the unaged rejuvenator.

* * * * *